United States Patent
Fukui et al.

(10) Patent No.: US 7,154,714 B2
(45) Date of Patent: Dec. 26, 2006

(54) RECORDING/REPRODUCING SEPARATED TYPE MAGNETIC HEAD HAVING DIFFERENTIAL BIAS TYPE MAGNETIC DOMAIN CONTROL STRUCTURE

(75) Inventors: Hiroshi Fukui, Hitachi (JP); Shigekazu Otomo, Sayama (JP); Shuichi Kojima, Hiratsuka (JP); Kouji Kataoka, Odawara (JP)

(73) Assignee: Hitachi Global Storage Technologies Japan, Ltd., Tokyo (JP)

( * ) Notice: Subject to any disclaimer, the term of this patent is extended or adjusted under 35 U.S.C. 154(b) by 200 days.

(21) Appl. No.: 10/464,574

(22) Filed: Jun. 19, 2003

(65) Prior Publication Data
US 2004/0047087 A1 Mar. 11, 2004

(30) Foreign Application Priority Data
Sep. 10, 2002 (JP) .................... 2002-264104

(51) Int. Cl.
*G11B 5/39* (2006.01)

(52) U.S. Cl. ............................. 360/324.12
(58) Field of Classification Search ............. 360/317, 360/324.1, 324.11, 324.12, 324.2, 327.3, 360/327.31
See application file for complete search history.

(56) References Cited

U.S. PATENT DOCUMENTS

| 6,266,218 | B1 | | 7/2001 | Carey et al. ........... 360/324.12 |
| 6,268,985 | B1 | * | 7/2001 | Pinarbasi ............... 360/324.12 |
| 6,385,018 | B1 | * | 5/2002 | Mukoyama ........... 360/324.12 |
| 6,661,620 | B1 | * | 12/2003 | Seigler et al. ............. 360/314 |
| 6,754,048 | B1 | * | 6/2004 | Li et al. .................... 360/315 |
| 2001/0021087 | A1 | * | 9/2001 | Guo et al. ................. 360/315 |
| 2004/0141261 | A1 | * | 7/2004 | Hasegawa et al. ..... 360/324.11 |
| 2004/0252419 | A1 | * | 12/2004 | Takano ................... 360/324.12 |
| 2005/0002130 | A1 | * | 1/2005 | Takano ................... 360/324.12 |
| 2005/0018367 | A1 | * | 1/2005 | Terunuma et al. ..... 360/324.12 |

FOREIGN PATENT DOCUMENTS

JP 10-105927 A * 4/1998
JP 2004-319060 A * 11/2004

OTHER PUBLICATIONS

Japanese Patent Laid–open No. 1991–125311; May 1991; Japan; Krounbi et al.

* cited by examiner

*Primary Examiner*—Jefferson Evans
(74) *Attorney, Agent, or Firm*—Antonelli, Terry, Stout and Kraus, LLP (57) ABSTRACT

A recording/reproducing separated type magnetic head comprising a first magnetic domain control layer for arranging the magnetizing direction of a free layer included in a magneto-resistive element to a predetermined direction, and a second magnetic domain control layer for generating a magnetic field in the direction opposite thereto to constitute a differential type bias structure. The recording/reproducing separated type magnetic head decreases an excessively strengthened longitudinal bias magnetic field in a central portion at a narrow track width while avoiding decrease of the fixed magnetic field at the end of the magneto-resistive element in the direction of the track width.

14 Claims, 10 Drawing Sheets

TRACK WIDTH DIRECTION

RECORDING/REPRODUCING SEPARATED TYPE MAGNETIC HEAD HAVING DIFFERENTIAL BIAS TYPE MAGNETIC DOMAIN CONTROL STRUCTURE

BACKGROUND OF THE INVENTION

1. Field of the Invention

The present invention relates to a recording/reproducing separated type magnetic head having a magneto-resistive sensor mounted thereon, the sensor utilizing the giant magneto-resistive (GMR) effect or the tuning magneto-resistive (TMR) effect.

2. Description of the Prior Art

Figure 10:
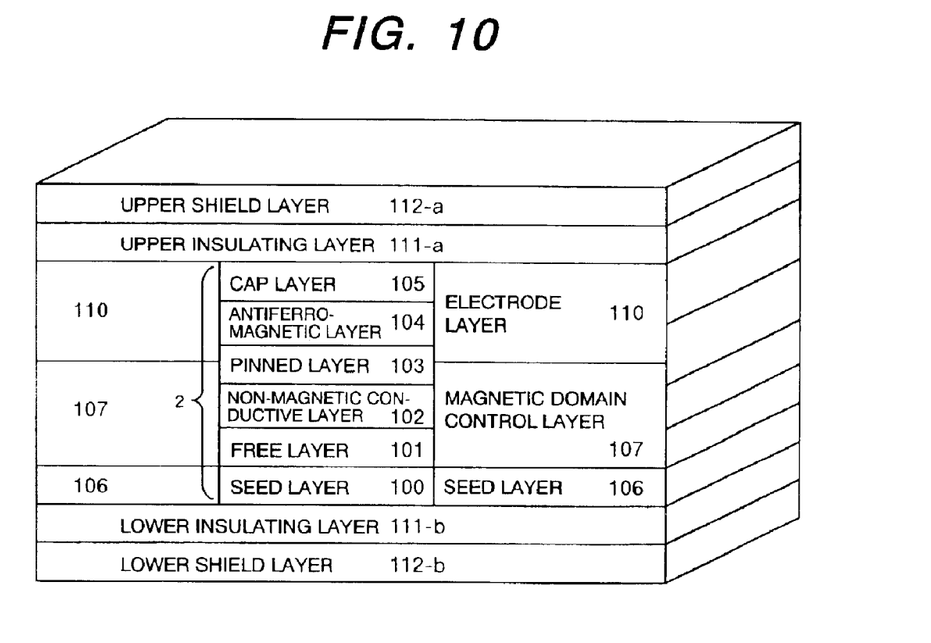
FIG. 10 is a schematic view showing a constitution of an existent magneto-resistive reproducing head.

FIG. 10 shows a basic constitution of a magneto-resistive sensor of an existent spin valve structure disclosed in Japanese Patent Laid-Open Hei 3-125311. In a spin valve structure (magneto-resistive effect element) 2, a free layer 101 having soft magnetic properties and a pinned layer 103 fixed for the magnetizing direction are stacked by way of a non-magnetic conductive layer 102 on a seed layer 100, an anti-ferromagnetic layer 104 is stacked on the pinned layer 103, and a cap layer 105 is disposed on the anti-ferromagnetic layer 104. The anti-ferromagnetic layer 104 serves to fix the magnetizing direction of the pinned layer 103. Further, the stack 2 is formed to have a predetermined width (track width) and stacks of magnetic domain control layers (hard bias layer) 107 for controlling the magnetizing direction of the free layer 101 and electrode layers 110 for supplying a sense current are disposed on opposite sides of the stack above the seed layer 106. The stacks are put between a lower shield layer 112-b and an upper shield layer 112-a by way of a lower insulating layer 111-b and an upper insulating layer 111-a.

The operation will be described briefly. The GMR effect is a phenomenon that resistance changes in accordance with the difference of angle between the magnetizing directions of the free layer 101 and the pinned layer 103. The resistance is lowest at an angle of zero where the magnetizing directions are identical, whereas the resistance is highest at an angle of 180° for anti-parallel state. Magnetization for the pinned layer 103 is fixed in the direction vertical to the track direction such that the angle is 90° when the external magnetic field is not applied.

The magnetizing direction of the free layer 101 is directed to the track due to the magnetic field from the hard bias layer 107 (longitudinal bias magnetic field) and the easy axis of the film itself. The difference of the angle in the magnetizing direction changes in accordance with the positive or negative directions of the external magnetic field, by which the resistance changes, and the sense current allows the change of the voltage across both ends of the magneto-resistive effect (GMR) element which operates as a magneto-resistive sensor.

Along with increase in the density and narrowing of the track width, the output from the structure described above lowers abruptly. This is because a dead region in which the sensitivity to signal magnetic fields is lowered is present at the end of the track width of the magneto-resistive element (sensing portion) 2 of a magneto-resistive sensor due to the intense longitudinal bias magnetic field generated from the hard bias layer 107. Further, since the gap Gs between the upper and lower shield layers changes scarcely while the track width has been narrowed recently, the longitudinal bias magnetic field remains even in the central portion of the track width of the sensing portion 2 as the case may be, making it difficult to improve the sensitivity.

Figure 11:
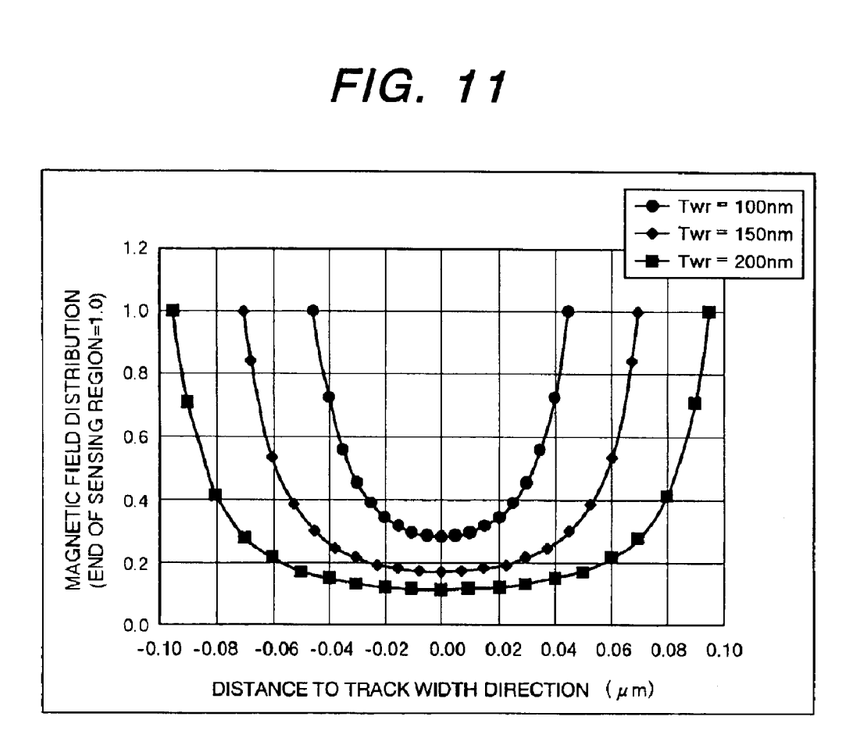
FIG. 11 is a graph showing the distribution of the longitudinal bias magnetic field in the existent hard bias structure.

FIG. 11 shows a normalized magnetic field distribution in the sensing portion for the track width Twr of 200, 150 and 100 nm at Gs of 60 nm in the sensing portion 2, and for Br·Th of 200 Gum, Br being residual magnetization of the hard bias layer 107 and Th being thickness of the hard bias layer 107. The ratio of the magnetic field at the center relative to the magnetic field at the end in the sensing portion 2 is 0.1 for the track width of 200 nm but the ratio increases as the track width is narrowed. The value increases to 0.3 for the width of 100 nm. This means that the sensitivity is reduced to about ⅓. Considering that the track width is narrowed to ½, the sensitivity is decreased to ⅙. To solve the lowering of the output, the longitudinal bias magnetic field is decreased by decreasing the residual magnetization or the thickness of the hard bias layer 107. While this can improve the output, the longitudinal bias magnetic field lowers. As a result, the magnetization at the track end is less directed to the track because of demagnetization. In the case where the magnetization of the free layer 101 is rotated by an external magnetic field, magnetization cannot be rotated smoothly at the track end if the longitudinal bias magnetic field is low. As a result, magnetization shows rotational operation with hysteresis to generate magnetic noises. As the case may be, asymmetricity with respect to the positive and negative output of the read waveform may also be increased. Along with increase in the output, the frequency for the occurrence of heads having noises or waveform asymmetry is increased and it is actually impossible to increase the output while lowering the longitudinal bias magnetic field.

To avoid lowering of the output with regard to the narrowing of the track, necessary resistance change can be obtained for the narrowing of track if the angle of the magnetization rotation to the external magnetic field can be ensured without increasing the longitudinal bias magnetic field from the hard bias layer at least in the sensing portion (magneto-resistive effect element). To prevent increase of the longitudinal bias magnetic field in the sensing portion, it is necessary to reduce the thickness of the hard bias layer in proportion with the track width. However, reduction for the thickness of the hard bias layer brings about lowering of the longitudinal bias magnetic field at both ends of the track. Accordingly, fixing for the magnetization at the track end becomes insufficient. This generates side reading. When fixing is further weakened, reproduction noises and asymmetrical fluctuation of waveforms increase. When side reading occurs, the effectively wide track width is required and an optically narrower track width is necessary for obtaining a required operation width to increase the burden on the process technology.

The problem includes reproduction noises and asymmetrical fluctuation of waveforms. The frequency for the occurrence of them is also determined by the longitudinal bias magnetic field at the end. When the thickness of the hard bias layer is reduced with an aim of improving the output, it naturally lowers the longitudinal bias magnetic field on the end and abruptly increases the reproduction noises and the asymmetry fluctuation of the waveforms. That is, there is a conflicting trade-off relationship at present between improvement in the output and noises, waveform asymmetricity or magnetic track width. If it is intended to increase the output, noises increases, the waveform asymmetry is increased and the magnetic track width is enlarged, making it actually difficult to improve the output.

As has been described above, the subject in the narrowing of the track width is to get out of the trade-off relation described above. However, the subject cannot be attained in the existent hard bias structure. In view of the above, this is attributable to that decrease of the longitudinal central bias magnetic field or decrease of the dead region for improving the output would lower the bias magnetic field at the end simultaneously and inevitably cause noises and waveform asymmetricity.

SUMMARY OF THE INVENTION

The present invention intends to make improvement of the output and reduction of noises compatible and realize a magneto-resistive sensor of narrow track having high sensitivity and stability to provide a recording/reproducing separated type magnetic head device suitable for high density recording.

In order to attain the purpose described above, the invention provides a desired longitudinal bias capable of maintaining the longitudinal bias magnetic field higher at the end of a sensing portion and abruptly decaying the same toward the center of the sensing portion. Such longitudinal bias magnetic field described above can be attained by using a two-layered magnetic domain control layer. A first magnetic domain control layer plays a role identical with that of the existent hard bias layer, that is, it generates a longitudinal bias of directing the magnetization of the free layer to a predetermined direction. The second magnetic domain control layer generates a longitudinal bias magnetic field in the direction opposite to that of the first magnetic domain control layer. The first magnetic domain control layer is disposed near the free layer of the sensing portion while the second magnetic domain control layer is disposed slightly apart therefrom. The magnetic field distribution in the sensing portion is determined in accordance with the difference between both of the two magnetic domain control layers. By the provision of the hard bias magnetic field distribution, the output can be improved, as well as increase in the reproduction noises and fluctuation of the waveform asymmetry can be prevented.

DETAILED DESCRIPTION OF THE PREFERRED EMBODIMENTS

Figure 2:
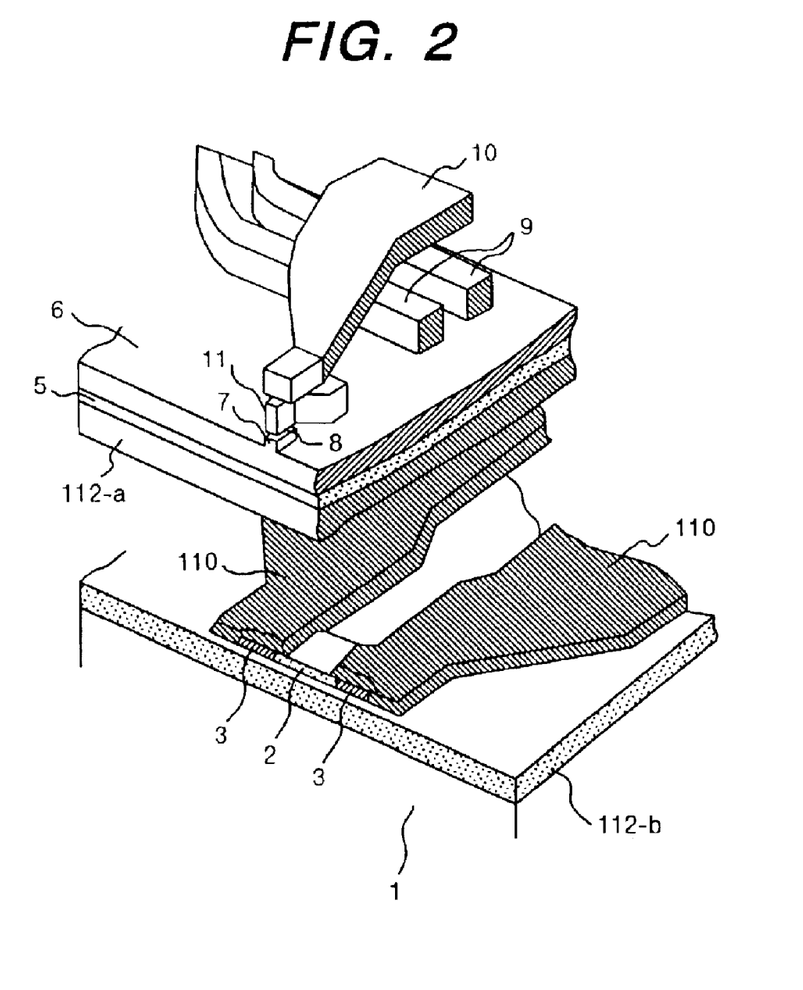
FIG. 2 is a perspective view for a portion showing the constitution of the recording/reproducing separated type magnetic head according to the invention.

FIG. 2 shows a perspective view for a portion of a recording/reproducing separated type magnetic head in which a magneto-resistive sensor and an inductive recording head are stacked.

A lower shield layer 112-b is formed on a substrate 1 which also serves as a head slider, a GMR element 2 is stacked thereon by way of a lower insulating layer (not illustrate), and magnetic domain control layers 3 and electrode layers 110 are stacked on opposite ends of the GMR element 2. Further, an upper shield layer 112-a is formed on the stack described above by way of an upper insulating layer (not illustrated) to constitute a magneto-resistive reproducing head (magneto-resistive sensor). An inductive recording head is formed by way of an insulating layer 5 above the magneto-resistive reproducing head. The inductive recording head comprises a lower magnetic layer 6 having a lower magnetic pole 7, a gap layer 8, coils 9, and an upper magnetic layer 10 having a top end magnetic pole 11.

(Embodiment 1)

Figure 1:
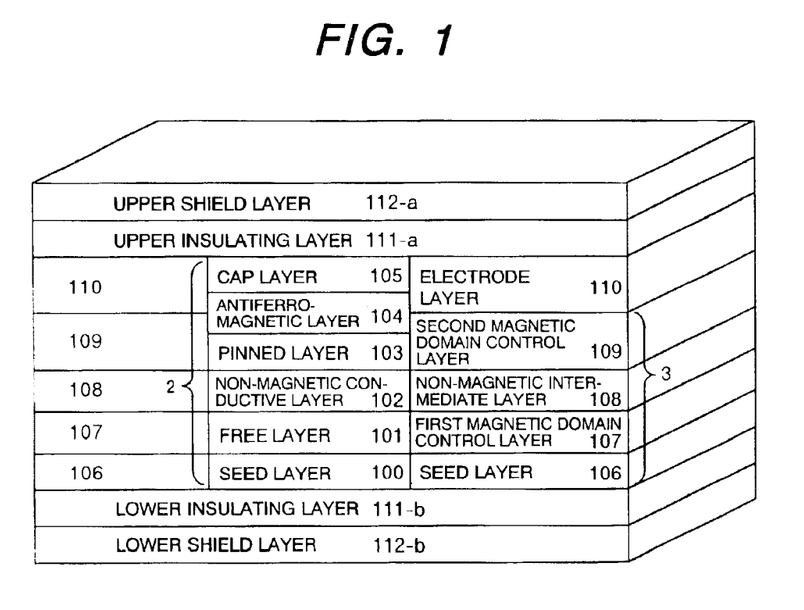
FIG. 1 is a schematic view showing a constitution of a magneto-resistive reproducing head according to a first embodiment of the present invention.

FIG. 1 shows a basic constitution of a magneto-resistive sensor according to a first embodiment of the invention. The magneto-resistive element (sensing portion) 2 has a constitution in which a seed layer 100, a free layer 101, a non-magnetic conductive layer 102, a pinned layer 103, an anti-ferromagnetic layer 104 and a cap layer 105 are stacked successively. The stacked film 2 is formed to have a predetermined width (track width), and stacks 3 each comprising a seed layer 106, a first magnetic domain control layer 107, a non-magnetic intermediate layer 108 and a second magnetic domain control layer 109, and electrode layers 110 are disposed at opposite ends of the stack 2. The constitution of the film material for the sensing portion 2 in this embodiment includes seed layer 100 [Ta 2 nm]/free layer 101 [NiFeCr 3 nm/NiFe 2 nm/CoFe 0.5 nm]/non-magnetic conductive layer 102 [Cu 2 nm]/pinned layer 103 [CoFe 2 nm/Ru 0.8 nm/CoFe 1.5 nm]/anti-ferromagnetic layer 104 [PtMn 15 nm]/cap layer 105 [Ta 3 nm]. The constitution for the film material of the stacks 3 on opposite ends of the sensing portion 2 includes seed layer 106 [Cr 5 nm]/first magnetic domain control layer 107 [CoCrPt 30 nm]/non-magnetic intermediate layer 108 [Cr 5 nm]/second magnetic domain control layer 109 [CoCrPt 30 nm/CoFe 10 nm], and the electrode layer 110 includes [Ta 80 nm].

Generally, the coercivity of 80 At/m (1 kOe) or more is necessary for the magnetic domain control layer. The first magnetic domain control layer 107 has a high coercivity near 160 AT/m (2 kOe) provided by the Cr seed layer 106. While Cr is used for the non-magnetic intermediate layer 108, it may also be Ta or Ru. The second magnetic domain control layer 109 is provided in this embodiment as a two-layered structure such as CoCrPt/NiFe, or a three-layered structure such as CoCrPt/NiFe/CoFe. With the constitution described above, even when the composition for CoCrPt is identical with that of the first magnetic domain control layer 107, the coercivity of the film can be optionally controlled depending on the soft magnetic material to be stacked and the film thickness thereof. Thus, the magnetizing directions for the first and the second magnetic domain control layer are controlled to the opposite directions by at first magnetizing the first magnetic domain control layer 107 to a strong magnetic field, for example, at about 800 AT/m (10 kOe) and magnetizing the second magnetic domain control layer 109 in the opposite direction by a magnetic field between the coercivity of the first and the second magnetic domain control layer. Further, in view of the relation of the film thickness, the first magnetic domain control layer 107 is located at a position relatively nearer to the free layer 101 than the second magnetic domain control layer 109.

Insulation layers 111-a/111-b are disposed above/below the element 2 and, further, upper/lower shield layers 112-a/112-b are disposed to the outside thereof. With the constitution, high output and low noises can be attained by maintaining the strong magnetic field at the end and reducing the magnetic field in the central portion as described above.

Figure 3A:
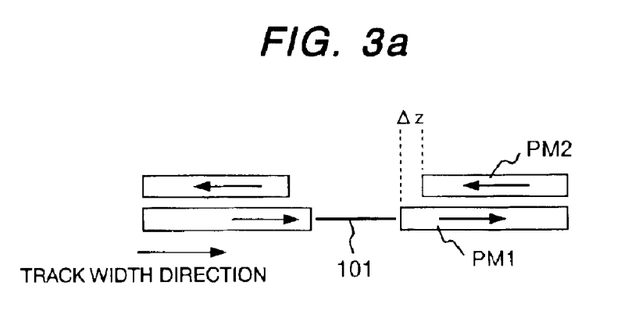
FIGS. 3a, 3b are graphs showing the dependence of the longitudinal bias magnetic field distribution on the residual magnetization of a second magnetic domain control layer in the first embodiment of the invention (with no shield layer)
Figure 3B:
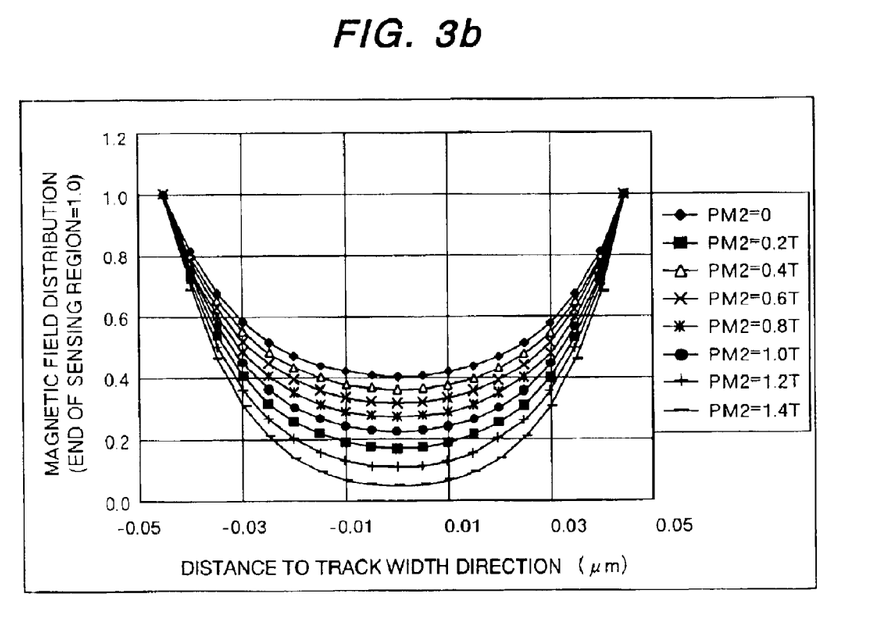

FIGS. 3a, 3b show an example of calculating the magnetic field distribution in the two-layered hard bias layer in a state without upper and lower shield layers for easy understanding of the bias structure according to the invention. It is assumed in this example of calculation that the width for the free layer 101 is 100 nm, the thickness of the first magnetic domain control layer PM1 is 30 nm, the thickness of the second magnetic domain control layer PM2 is also 30 nm and they are stacked by way of a non-magnetic conductive layer of 5 nm thickness. The residual magnetization of PM1 is 1 T.

As shown in FIG. 3a, the end of PM2 is located apart from the free layer 101 by ΔZ from the end of PM1. In this case, the residual magnetization of PM2 is changed within a range from 0 to 1.4 T. In this example, ΔZ was 5 nm. FIG. 3b shows normalized distributions of the magnetic field in the sensing portion along the distance in the direction of the track width. In the existent structure at PM2=0, the central magnetic field remains by 40% of the end magnetic field. As the residual magnetization Br of PM2 increases, the distribution of the magnetic field changes to a distribution in which the magnetic field lowers abruptly toward the center and, when it is increased to about 1.4 T, the magnetic field at the central portion decreases to 10% or less of the end magnetic field. That is, it is possible to decrease the magnetic field at the central portion and decrease the dead region while keeping strong magnetic field at the end to prevent worsening of reproduction noises and waveform asymmetricity. Thus, output can be improved at low noises. The end magnetic field in this case decreases by about 20% with the change of BR in PM2. Practically, PM1 is selected to the condition capable of obtaining necessary end magnetic field.

Figure 4:
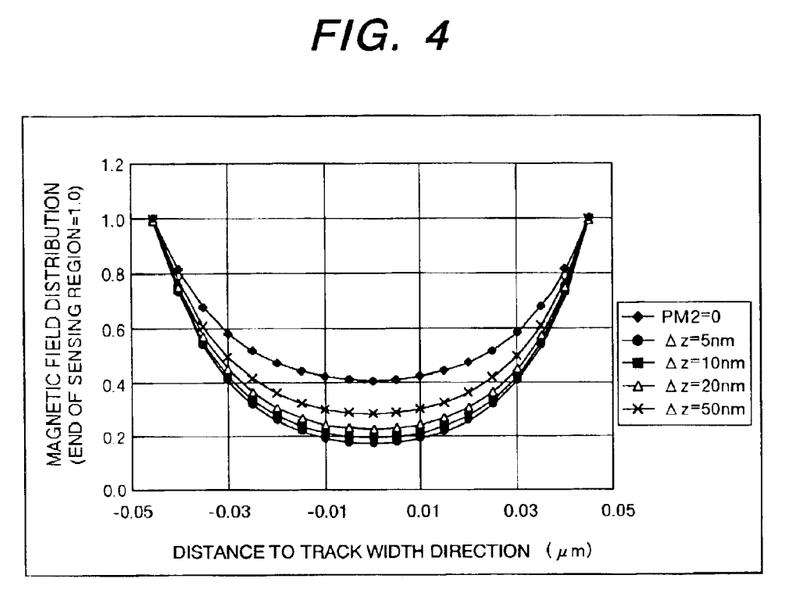
FIG. 4 is a graph showing the dependence of the longitudinal bias magnetic field distribution on the position of the second magnetic domain control layer in the first embodiment of the invention (with no shield layer)

FIG. 4 shows magnetic field distributions when the position of the second magnetic domain control layer PM2 is changed. The residual magnetization in PM2 was set at 1 T and other conditions were identical with those for FIG. 3b. The distribution of the magnetic field less changes even when ΔZ is changed from 5 nm to 50 nm. Accordingly, degree of freedom is high in view of process. As described above, an abrupt distribution of magnetic field can be obtained because a magnetic field which is relatively planer and in the opposite direction is applied using the second magnetic domain control layer PM2 in the sensing portion to an abruptly changing magnetic field formed by the first magnetic domain control layer PM1, by which a distribution in which the magnetic field is substantially zero at the central portion can be formed.

Figure 5A:
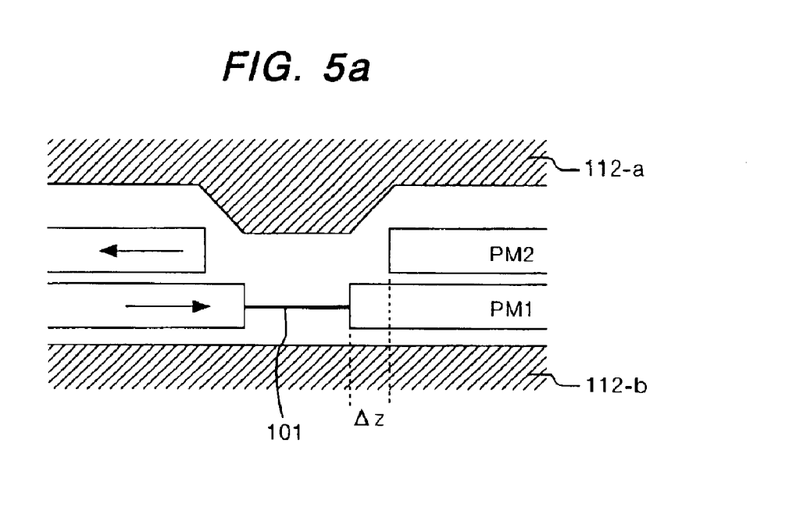
FIGS. 5a, 5b are graphs showing the dependence of the longitudinal bias magnetic field distribution on the film thickness of the second magnetic domain control layer in the first embodiment of the invention (with shield layer)

Then, FIG. 5a shows the result in a case of disposing sealed layers on opposite sides of the spin valve layer. It was designed or set such that the distance Gs between the upper shield layer 112-a and the lower shield layer 112-b was 60 nm, the width for the sensing portion (free layer) 101 was 100 nm, and the thickness of the first magnetic domain control layer PM1 was 20 nm. The residual magnetization was 1 T for the first magnetic domain control layer PM1 and also 1 T for the second magnetic domain control layer PM2. In this case, a top spin valve layer having the antiferromagnetic layer 104 disposed thereon is to be studied. The free layer 101 is at a position 20 nm from the lower shield layer 112, a first magnetic domain control layer PM1 is disposed on the side of the free layer 101, and a second magnetic domain control layer PM2 is disposed above the first magnetic domain control layer PM1.

Figure 5B:
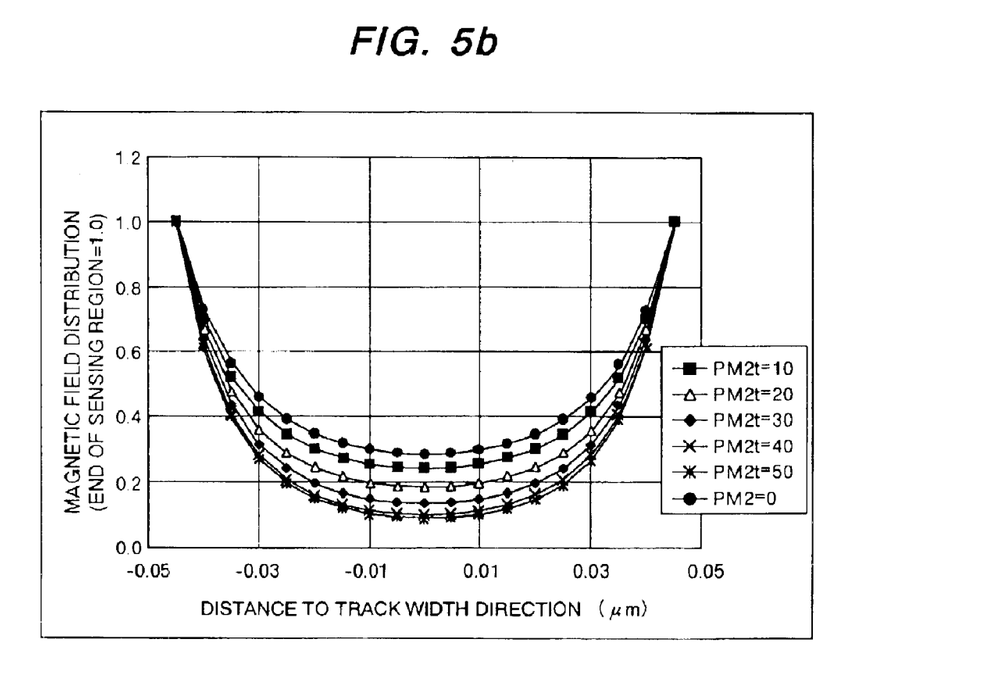

FIG. 5b shows magnetic field distributions in the case where the distance ΔZ between the end of PM2 and the end of PM1 was set to 20 nm and the thickness of PM2 was changed. The ratio of the end magnetic field to the central magnetic field is 0.3 in the existent structure with no PM2. While the ratio of the magnetic field at the end to the magnetic field at the central portion decreases to less than 0.4 different from FIG. 3b, it is still high. When calculation is made while changing the thickness of PM2 between 10 nm to 50 nm, the magnetic field in the central portion lowers along with the film thickness. At PM2=50 nm, the ratio decreases to 0.1. Since the magnetic field is steep, the width for the dead region is also decreased. While the thickness of the second magnetic domain control layer PM2 is changed in this example, a similar effect can also be obtained by increasing the residual magnetization BR. As can be seen from the results, the effect of decreasing the central magnetic field can not be obtained unless at least the product BrTh for the residual magnetization Br and the film thickness Th of the second magnetic domain control layer PM2 is larger than BrTh of the first magnetic domain control layer PM1. The value 0.1 for the magnetic field ratio obtained by making the BrTh of the second magnetic domain control layer PM2 sufficiently larger is a value capable of making improvement of the output and reduction of the noises compatible.

Figure 6:
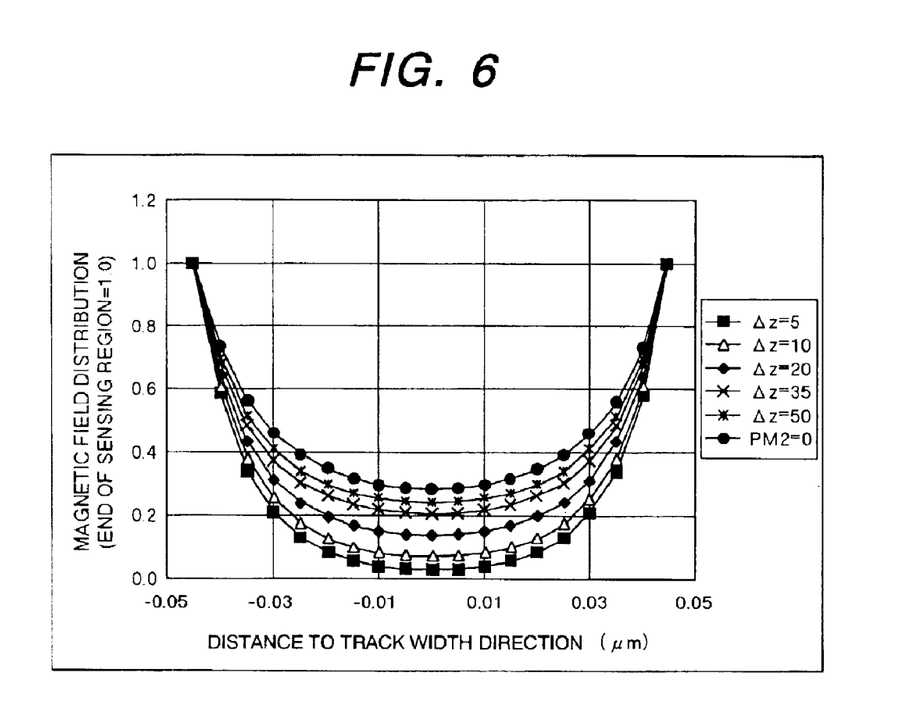
FIG. 6 is a graph showing the dependence of the longitudinal bias magnetic field distribution on the position of the second magnetic domain control layer in the first embodiment of the invention (with shield layer)

FIG. 6 shows a case in which the position for PM2 is changed. The thickness of PM2 is set to 30 nm. As the distance in the direction of the track width is closer, the distribution of the magnetic field is improved. In particular, the distance between the end of PM1 and the end of PM2 is 10 nm or less, the central magnetic field is decreased to 0.1 or less. In the case where the shield layer is present, since the magnetic field of PM2 is absorbed to the shield layer, the effect of PM2 is decreased as PM2 is spaced apart. In any case, however, even when the shield layer is disposed, a magnetic field distribution that the magnetic field lowers abruptly toward the center of the track is obtained in the sensing portion by operating the bias magnetic field generated from PM1 and PM2 in a differential manner. The hard bias system is referred to as a differential bias system. By using the system, improvement in the output and reduction of the noises can be made compatible in the narrow track.

As described above, by using the magneto-resistive sensor according to the first embodiment of the invention, a magnetic head with narrow track, at high sensitivity and suitable for high linear recording density can be obtained and a magnetic recording apparatus having high recording density can be attained.

While a spin valve layer constitution in which the anti-ferromagnetic layer 104 is disposed at an upper portion thereof (top spin valve; TSV) is shown in the first embodiment of FIG. 1, it is apparently applicable also to a spin valve layer constitution in which the anti-ferromagnetic layer 104 is disposed at a lower portion thereof (bottom spin value; BSV), or a dual spin valve in which pinned layers are on both sides of the free layer (DSV). However, in the case of BSV, since the position of the free layer 101 is higher by the thickness of the anti-ferromagnetic layer 104, the position of the second magnetic domain control layer 109 is higher. Therefore, magnetic fluxes generated from the second magnetic domain control layer 109 are tended to be absorbed easily in the upper shield. As a result, the effect of the magnetic field from the second magnetic domain control layer 109 on the sensing portion is weakened to reduce the effect of decreasing the central magnetic field. Accordingly, the effect of the differential bias can be obtained more easily in TSV than in BSV.

Then, a modified example 1 of the first embodiment for realizing the differential bias system will be described with reference to FIG. 1. In this example, while the first magnetic domain control layer 107 is formed of a hard magnetic material, the second magnetic domain control layer 109 is formed of a soft magnetic layer. As the material, a film of NiFe or CoFe or a multi-layered film thereof is used. To operate the constitution as differential bias, there are the following two methods.

The first is a method of using Ru for the non-magnetic intermediate layer 108. As known for the spin valve layer, when the film thickness of Ru is made to 6–10 Å, magnetic layers on both sides of Ru conduct anti-ferromagnetic coupling. The differential bias described above is formed by utilizing the coupling. In this case, it is a necessary condition that the anti-ferromagnetic coupling magnetic field is lower than the coercivity of the first magnetic domain control layer 107. When the first magnetic domain control layer 107 is magnetized by an external magnetic field higher than the coercivity of the first magnetic domain control layer 107 and, successively, the external magnetic field is reduced to 0, magnetization for the second magnetic domain control layer 109 is arranged in the anti-parallel direction with magnetization of the first magnetic domain control layer 107 by anti-ferromagnetic coupling.

The second is a method of constituting the second magnetic domain control layer 109 with two layers of a soft magnetic layer and an anti-ferromagnetic layer. IrMn or PtMn is used for the anti-ferromagnetic material. The magnetizing direction of the soft magnetic layer is fixed in a predetermined direction by a heat treatment in the magnetic field. An external magnetic field is applied to the hard magnetic layer of the first magnetic domain control layer 107 in the direction anti-parallel to the predetermined direction to magnetize the layer. In this case, the non-magnetic intermediate layer 108 is formed of Ta, Ru or the like. While it is not always necessary to exert anti-ferromagnetic coupling as in the first method described above, anti-ferromagnetic coupling by the Ru intermediate layer may be used in combination in order to attain the anti-parallelism more reliably.

Further, a modified example 2 of attaining the differential bias system will be described with reference also to FIG. 1. This is a method of forming the first magnetic domain control layer 107 with a soft magnetic material. In the same manner as described above, the second magnetic domain control layer 109 is formed of a hard magnetic material, or formed of a soft magnetic material. Specific film constitutions will be described successively. The example for the constitution of the former includes: seed layer 106 [Ta 3 nm]/first magnetic domain control layer 107 [PtMn 12 nm/CoFe 15 nm]/non-magnetic intermediate layer 108 [Cr 5 nm]/second magnetic domain control layer 109 [CoCrPt 40 nm]. The example for the latter constitution includes: seed layer 106 [Ta 3 nm]/first magnetic domain control layer 107 [PtMn 12 nm/CoFe 15 nm]/non-magnetic intermediate layer 108 [Ru 0.8 nm]/second magnetic domain control layer 109 [CoFe 30 nm]. In the former, the first magnetic domain control layer 107 is constituted as a two-layered constitution of a PtMn anti-ferromagnetic layer and a CoFe soft magnetic layer in which the magnetizing direction is fixed. A hard magnetic material is stacked above the first magnetic domain control layer. In the latter constitution, the first magnetic domain control layer 107 has the same constitution as in the former in which the magnetizing direction in the second magnetic domain control layer 109 formed of the soft magnetic material is controlled to the anti-parallel direction by using the anti-ferromagnetic coupling of Ru. Each of them is a structure intended to decrease the central magnetic field by providing the second magnetic domain control layer 109 to the existent magnetic domain control system referred to as exchange coupling type so far.

(Embodiment 2)

Figure 7:
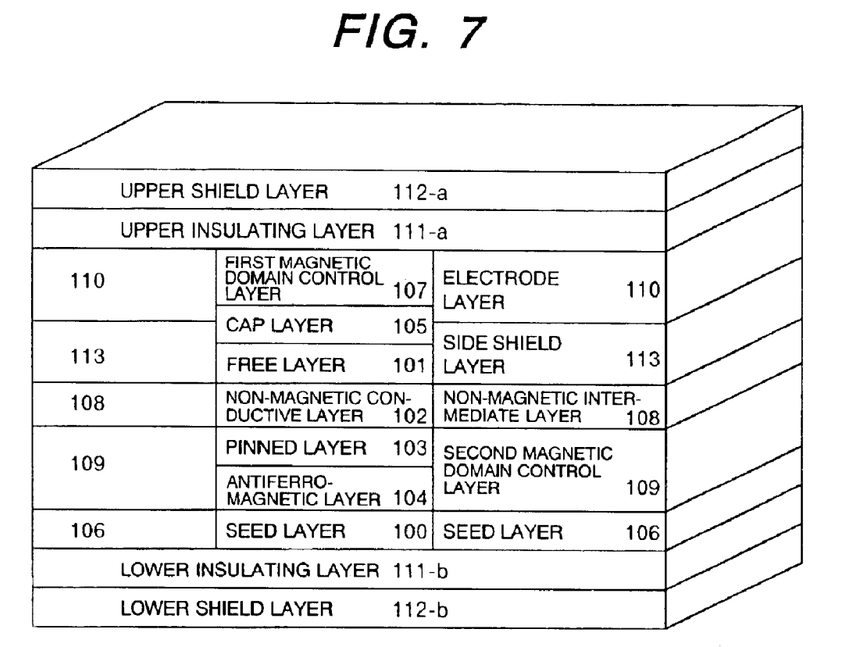
FIG. 7 is a schematic view showing a constitution of a magneto-resistive reproducing head of a second embodiment according to the invention.

FIG. 7 shows a second embodiment of the invention. Provision of second magnetic domain control layers 109 on opposite sides of a spin valve film is effective for the decrease of the central magnetic field also even when applied to a magnetic domain control system of forming a first magnetic domain control layer 107 by stacking the spin valve as shown in FIG. 7. In this case, they are stacked as; spin valve film/cap layer Ru/first magnetic domain control layer [CoFe/IrMn(or PtMn)] and they are subjected to milling to have an identical track width. Since the magnetizing direction of CoFe in the upper portion is arranged in a certain direction due to IrMn (or PtMn) anti-ferromagnetic layer, it gives a strong magnetic field to a free layer 101 at the track end. That is, the CoFe/IrMn (or PtMn) layer plays a role as the first magnetic domain control layer 107. By disposing the second magnetic domain control layers 109 that generates a magnetic field in the opposite direction on both sides of the sensing portion, the magnetic field in the central portion can be decreased and the improvement of the output can be attained. In this case, side shield layers 113 can be disposed on both sides of the free layer 101. This is important for decreasing side reading.

(Embodiment 3)

Figure 8:
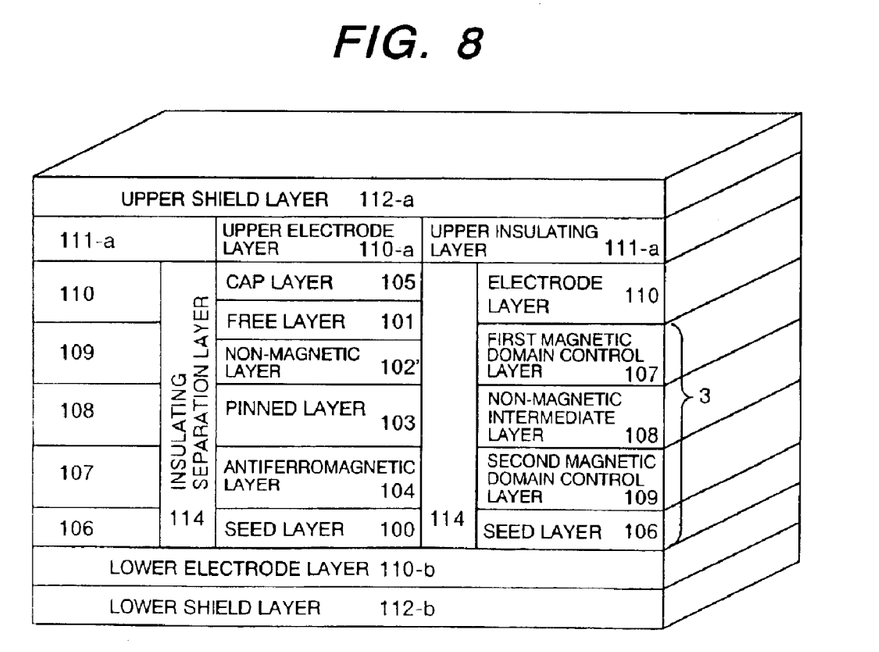
FIG. 8 is a schematic view showing a constitution of an embodiment of the invention applied to a TMR element and a CPP element.

FIG. 8 shows a third embodiment in which the differential bias system is used for a tunneling magneto-resistive element (TMR). The layer constitution of the TMR element is similar with that of the spin valve element, in which an insulating layer ($Al_2O_3$) is used for a non-magnetic layer 102' between a pinned layer 103 and a free layer 101. This is a reproducing element that utilizing a phenomenon that tunneling current changes depending on the difference of angle for the magnetizing direction between magnetic layers on both sides of the insulating layer 102'. In this embodiment, a seed layer 100, an anti-ferromagnetic layer 104, the pinned layer 103, the insulating layer 102', the free layer 101 and a cap layer 105 are stacked in this order.

The tunneling current to the sensing portion is supplied through an upper electrode 110-a and a lower electrode 110-b disposed above and below the element. Magnetic domain control layers 3 are disposed at the outside of insulation separation layers 114 disposed on both right and left sides of the TMR element. The layer includes a seed layer 106, a second magnetic domain control layer 109, an non-magnetic intermediate layer 108 and a first magnetic domain control layer 107. The insulation separation layer 114 is disposed for preventing element short-circuit caused by the magnetic domain control layer 3. Further, since the free layer 101 is located at an upper portion in this embodiment, the first magnetic domain control layer 107 is also disposed at an upper portion different from the constitution in FIG. 1 described above. In principle, the first magnetic domain control layer 107 is disposed at a position of the free layer 101 near the end of the sensing portion. The specific layer constitution of the tunneling element includes: seed layer 100 [NiFeCr 3 nm]/anti-ferromagnetic layer 104 [PtMn 150 nm]/pinned layer 103 [CoFe 3 nm]/insulating layer 102' [$Al_2O_3$ 0.5 nm]/free layer 101 [CoFe 1 nm/NiFe 2 nm]/cap layer 105 [Ta 0.5 nm]. The effect on the free layer 101 is identical with that as described for FIG. 1 and it is possible to generate a strong magnetic field at the end of the track and the magnetic field in the central portion can be reduced. As a result, improvement of the output and the reduction of the noises can be obtained.

(Embodiment 4)

Then, a fourth embodiment of applying the differential bias system to a CPP (current perpendicular to the plane) element will be described with reference to FIG. 8. The layer constitution of CPP is identical with that of a usual spin valve layer. However, current to the sensing portion is supplied perpendicular to the film and the change of resistance is utilized to constitute a reproducing element. Accordingly, a non-magnetic layer 102' in FIG. 8 is constituted with Cu. The magnetic domain control is identical with that in the TMR element described previously. Further, the differential bias effect is also identical. Different from the TMR element, the element resistance is lower by nature in the CPP element and the insulative separation layer 114 on both right and left sides are not always necessary as in the TMR element but it may be disposed.

(Embodiment 5)

Figure 9:
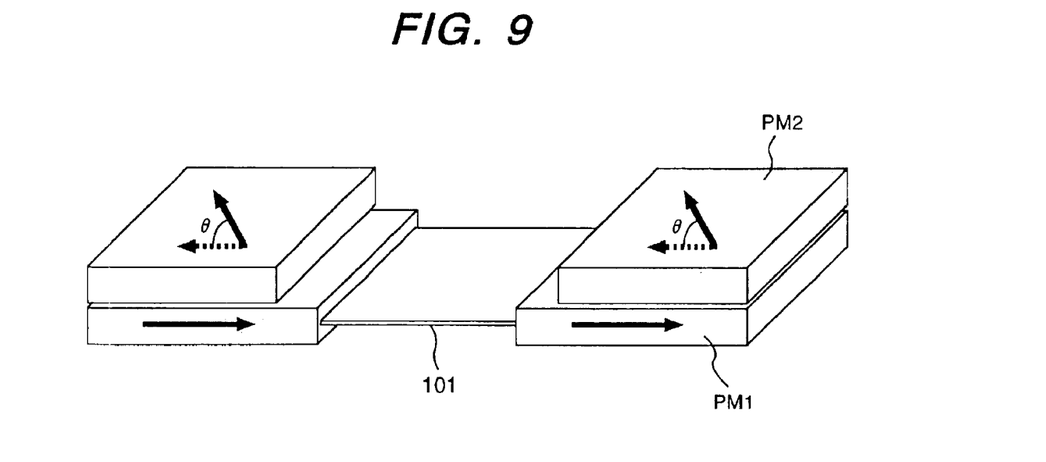
FIG. 9 is a view for the direction of magnetic field in a case of oblique magnetization to a differential bias type magnetic domain control layer of a magneto-resistive reproducing head according to a fifth embodiment of the invention.

FIG. 9 shows a fifth embodiment in which the magnetizing direction of the magnetic domain control layer is changed. Usually, the magnetizing direction in the magnetic domain control layer is directed to the direction of the track width. In this embodiment, as shown in FIG. 9, the magnetizing direction in the second magnetic domain control layer PM2 is inclined by θ from the direction of the track width. In this case, the magnetic field in the second magnetic domain control layer PM2 contributing to the free layer 101 is cos component of the residual magnetization, which is effectively equivalent to lowering BrTh in the second domain control layer PM2. Accordingly, the magnetic field of the second magnetic domain control layer PM2 can be controlled even after forming the magnetic domain control layer in the first, third or fifth embodiment. The improvement of the sensitivity can be compatible with increase in noise and waveform asymmetricity when an appropriate angle θ is taken to such an extent as not causing deterioration of the noises or the waveform asymmetricity. When the second magnetic domain control layer PM2 is made somewhat thicker considering the process margin and the angle θ is controlled so as to be optimal individually in the subsequent step, it is possible to obtain an optimal magnetic domain control magnetic field as a differential bias type magnetic domain control structure. Specifically, in the case where there is no problem such as noises in a state of directing the first magnetic domain control layer PM1 and the second magnetic domain control layer PM2 in an identical magnetizing direction in the initial state, the direction of the second magnetic domain control layer PM2 is gradually changed. Since the effective magnetic field for end fixing weakens in accordance with the change of the angle, noises increase remarkably as it exceeds a certain angle. That is, while the output increases in proportion with the change of the angle, noises start to increase remarkably at a certain angle as a boundary. The angle control can be attained by setting an angle θ before remarkable increase of the noise as an "optimal" angle in view of the process. This method is enabled by making the coercivity of the second magnetic domain control layer PM2 smaller than that of the first magnetic domain control layer PM1.

Further, in FIG. 9, while description has been made to a manufacturing method of inclinedly magnetizing the second magnetic domain control layer PM2, and a differential bias type magnetic head manufactured by the method, a predetermined angle α may be provided to the magnetic field direction of the first magnetic domain control layer PM1. Provision of the angle of magnetization to the first magnetic domain control layer PM1 weakens the magnetization intensity for magnetically fixing the end of the MR device 2 but it is possible to provide the angle of magnetization also to the first magnetic domain control layer PM1 so long as it is within a range capable of effectively fixing the end magnetization for the MR element 2. The differential bias type magnetic domain control layer in this embodiment can firmly fix magnetically the end of the MR element 2 mainly by using the first magnetic domain control layer PM1 and only the internal magnetization of the free layer 101 can be made to move more easily. It is also possible to provide the magnetization angle α in the direction of the magnetic field of the first magnetic domain control layer PM1 within a range capable of effectively fixing the end magnetization for the MR element.

As has been described above, the respective angles required for maximizing the output can be determined on every head elements individually by controlling the angle of magnetization for each of the first magnetic domain control layer PM1 and the second magnetic domain control layer PM2, while considering fixing at the end and inside mobility. Further, the manufacturing method can improve the yield in the manufacture of the magnetic head.

Further, for control conducted in a case of a single magnetic domain control layer, the magnitude of magnetic domain control magnetic field on the track end is merely controlled simply. By setting an appropriate angle θ to such an extent as not deteriorating noises or waveform asymmetricity, it is possible to control the optimal magnetic domain control magnetic field individually and attain high sensitivity. However, it is not possible to get out of the trade-off relation between the output and the noises or the waveform symmetricity.

The method of inclining the magnetizing direction of the magnetic domain control layer can enhance the effect by the combined use with the differential bias.

An inductive recording head is stacked, as shown in FIG. 2, to the magneto-resistive sensor in each of the embodiments according to the present invention described above to complete a recording/reproducing separated type magnetic head. The recording/reproducing separated type magnetic head is mounted on a magnetic disk storage apparatus to conduct information recording and reproduction to a magnetic disk. The magnetic disk storage apparatus comprises a magnetic disk attached to a spindle rotated by a motor, a suspension for supporting a recording/reproducing separated type magnetic head, a head arm to which the suspension is attached, a voice coil motor to which the head arm is attached, and a signal processing circuit, and rotationally drives the recording/reproducing separated type magnetic head in the radial direction of a magnetic disk by the voice coil motor to conduct positioning to an optional track and records or reproduces information.

According to the present invention, it is possible to obtain a magnetic field distribution in which the magnetic domain control magnetic field is strong at the end and lowers abruptly toward the central portion of the sensing portion also in a narrowed track width by forming the magnetic domain control layer of the magneto-resistive reproducing head into a differential type having a first magnetic domain control layer that applies strong magnetic field to the track end of the free layer and a second magnetic domain control layer of offsetting the magnetic field of the first magnetic domain control layer to decrease the magnetic field in the central portion of the sensing portion. As a result, since the longitudinal bias magnetic field is low in the central portion of the sensing portion, magnetization can rotate easily by the external magnetic field and large resistance change is caused at the central position. Since the width for the dead region in the sensing portion is also narrowed, reproduction with high sensitivity can be obtained. On the other hand, since the end of the sensing portion is fixed by a strong magnetic field, noises are not generated accompanying the improvement in the output as in the prior art.

What is claimed is:

1. A recording/reproducing separated type magnetic head, comprising:

a magneto-resistive reproducing head including a lower shield, an upper shield, a magneto-resistive element having a stack of a free layer, a non-magnetic conductive layer, a pinned layer and an anti-ferromagnetic layer disposed by way of insulating layers between the lower shield and the upper shield, first magnetic domain control layers disposed on opposite ends of the magneto-resistive element for controlling the magnetizing direction of the free layer to take a predetermined direction, second magnetic domain control layers disposed on opposite ends of the magneto-resistive element for generating a magnetic field in the direction opposite to the magnetizing direction of the first magnetic domain control layer, and electrode layers which are disposed on opposite ends of the magneto-resistive element and supply an electric current to the magneto-resistive element; and an inductive type recording head disposed adjacent to the magneto-resistive reproducing head, wherein the first magnetic domain control layer is disposed near the free layer and the second magnetic domain control layer is disposed apart from the free layer, wherein the product BrTh of residual magnetization Br and film thickness Th of the first magnetic domain control layer is smaller than BrTh of the second magnetic domain control layer.

2. A recording/reproducing separated type magnetic head according to claim 1, wherein the first and the second magnetic domain control layers are stacked and arranged by way of a non-magnetic intermediate layer on opposite ends of the magneto-resistive element.

3. A recording/reproducing separated type magnetic head according to claim 1, wherein the first magnetic domain control layer and the second magnetic domain control layer are formed of a hard magnetic material for both of the layers, of a hard magnetic material and a soft magnetic material, respectively, for the layers, of a soft magnetic material and a hard magnetic material, respectively, for the layers, or formed of a soft magnetic material for both of the layers.

4. A recording/reproducing separated type magnetic head according to claim 3, wherein an anti-ferromagnetic layer for fixing the magnetizing direction is stacked to a soft magnetic layer of the first or the second magnetic domain control layer.

5. A recording/reproducing separated type magnetic head according to claim 4, wherein the hard magnetic material is formed of CoCrPt, the soft magnetic material is formed of NiFe or CoFe, the anti-ferromagnetic material is formed of IrMn or PtMn, wherein a non-magnetic intermediate layer provided between the first and the second magnetic domain control layers is formed of one layer of an element of Cr, NiCr, Ta or TaW, or two layers of a plurality of elements selected optionally therefrom.

6. A recording/reproducing separated type magnetic head according to claim 1, wherein the magnetizing direction of the second magnetic domain control layer which is opposite to the magnetizing direction of the first magnetic domain control layer is further inclined by a predetermined angle.

7. A recording/reproducing separated type magnetic head, comprising:

a magneto-resistive reproducing head including a lower shield, an upper shield, a magneto-resistive element having a stack of an anti-ferromagnetic layer, a pinned layer, a non-magnetic conductive layer, and a free layer disposed by way of insulating layers between the lower shield and the upper shield, a first magnetic domain control layer stacked by way of an insulating layer at an upper portion of the magneto-resistive element for controlling the magnetizing direction of the free layer to take a predetermined direction, second magnetic domain control layers disposed at opposite ends of the magneto-resistive element for generating a magnetic field in the direction opposite to the magnetizing direction of the first magnetic domain control layer, and electrode layers which are disposed on opposite ends of the magneto-resistive element and supply an electric current to the magneto-resistive element; and an inductive type recording head disposed adjacent to the magneto-resistive reproducing head, wherein the magnetizing direction of the second magnetic domain control layer which is opposite to the magnetizing direction of the first magnetic domain control layer is further inclined by a predetermined angle, wherein the product BrTh of residual magnetization Br and film thickness Th of the first magnetic domain control layer is smaller than BrTh of the second magnetic domain control layer.

8. A recording/reproducing separated type magnetic head, comprising:

a magneto-resistive reproducing head including a lower shield, an upper shield, a lower electrode and an upper electrode disposed between the lower shield and the upper shield, a magneto-resistive element having a stack of an anti-ferromagnetic layer, a pinned layer, a non-magnetic conductive layer and a free layer, the stack being disposed between the lower electrode and the upper electrode, first magnetic domain control layers disposed on opposite ends of the magneto-resistive element for controlling the magnetizing direction of the free layer to take a predetermined direction, second magnetic domain control layers disposed on opposite ends of the magneto-resistive element for generating a magnetic field in the direction opposite to-the magnetizing direction of the first magnetic domain control layer; and an inductive type recording head disposed adjacent to the magneto-resistive reproducing head, wherein the first magnetic domain control layer is disposed near the free layer and the second magnetic domain control layer is disposed being spaced apart from the free layer, wherein the product BrTh of residual magnetization Br and film thickness Th of the first magnetic domain control layer is smaller than BrTh of the second magnetic domain control layer.

9. A recording/reproducing separated type magnetic head according to claim 8, wherein the first and the second magnetic domain control layers are stacked and arranged by way of a non-magnetic intermediate layer on opposite sides of the magneto-resistive element.

10. A recording/reproducing separated type magnetic head according to claim 8, wherein the magnetizing direction of the second magnetic domain control layer which is opposite to the magnetizing direction of the first magnetic domain control layer is further inclined by a predetermined angle.

11. A recording/reproducing separated type magnetic head, comprising:

a tunnel magneto-resistive reproducing head including a lower shield, an upper shield, a lower electrode and an upper electrode disposed between the lower shield and the upper shield, a tunnel magneto-resistive element having a stack of an anti-ferromagnetic layer, a pinned layer, a non-magnetic conductive layer and a free layer, the stack being disposed between the lower electrode and the upper electrode, first magnetic domain control layers disposed by way of insulating layers on opposite ends of the tunnel magneto-resistive element for controlling the magnetizing direction of the free layer to take a predetermined direction, second magnetic domain control layers disposed by way of the insulating layers on opposite ends of the tunnel magneto-resistive element for generating a magnetic field in the direction opposite to the magnetizing direction of the first magnetic domain control layer; and an inductive type recording head disposed adjacent to the tunnel magneto-resistive reproducing head, wherein the first magnetic domain control layer is disposed near the free layer and the second magnetic domain control layer is disposed apart from the free layer, wherein the product BrTh of residual magnetization Br and film thickness Th of the first magnetic domain control layer is smaller than BrTh of the second magnetic domain control layer.

12. A recording/reproducing separated type magnetic head according to claim 11, wherein the first and the second magnetic domain control layers are stacked and arranged by way of a non-magnetic intermediate layer on opposite sides of the tunneling magneto-resistive element.

13. A recording/reproducing separated type magnetic head according to claim 11, wherein the magnetizing direction of the second magnetic domain control layer which is opposite to the magnetizing direction of the first magnetic domain control layer is further inclined by a predetermined angle.

14. A recording/reproducing separated type magnetic head, comprising:

a magneto-resistive reproducing head including a lower shield, an upper shield, a magneto-resistive element having a stack of a free layer, a non-magnetic conductive layer, a pinned layer and an anti-ferromagnetic layer disposed by way of insulating layers between the lower shield and the upper shield, first magnetic domain control layers disposed on opposite ends of the magneto-resistive element for controlling the magnetizing direction of the free layer to take a predetermined direction, second magnetic domain control layers disposed on opposite ends of the magneto-resistive element for generating a magnetic field in the direction opposite to the magnetizing direction of the first magnetic domain control layer, and electrode layers which are disposed on opposite ends of the magneto-resistive element to supply an electric current to the magneto-resistive element; and an inductive type recording head disposed adjacent to the magneto-resistive reproducing head, wherein an anti-ferromagnetic layer for fixing the magnetizing direction is stacked to a soft magnetic layer of the first or the second magnetic domain control layer, wherein the hard magnetic material is formed of CoCrPt, the soft magnetic material is formed of NiFe or CoFe, the anti-ferromagnetic material is formed of IrMn or PtMn.

* * * * *